United States Patent Office 2,968,641
Patented Jan. 17, 1961

2,968,641

STABILIZED POLYPROPYLENE WITH AN A-STAGE PARA - TERTIARYALKYLPHENOL-FORMALDEHYDE RESIN

John S. Roberts and Julian K. Rose, South Charleston, W. Va., assignors to Union Carbide Corporation, a corporation of New York No Drawing. Filed May 14, 1958, Ser. No. 735,103

6 Claims. (Cl. 260—43)

This invention relates to processes for the stabilization of polypropylene and to the stabilized compositions produced thereby. More particularly it is concerned with the addition of small amounts, sufficient to reduce oxidation, of certain low molecular weight phenol-formaldehyde resins to polypropylene.

Solid polypropylene is developing considerable commercial importance because of some advantages it has over polyethylene. For example, it has a higher melting temperature, a lower density and greater stiffness moduli than polyethylene. Polypropylene polymers can be produced in amorphous or crystalline form depending upon the catalysts employed and the reaction conditions. The highly crystalline polypropylenes having melt indices (measured at 190° C.) within the range of from about 0.01 to about 50 are particularly suitable for use in the production of fibers, films and other extruded and molded items. These high molecular weight, highly crystalline polypropylenes are characterized by their clarity, their high toughness and strength, their good mechanical resiliency and their high stiffness moduli.

Unfortunately, polypropylene polymers are subject to severe deterioration from the oxidative action of air at elevated temperatures. For example, fibres that are melt spun from polypropylene and have high initial strengths, 4 to 5 grams per denier, lose about 50 percent of their strength within about 50 hours after being placed in a circulating air oven at 125° C., and tend to disintegrate completely within about 100 hours to a powdery material. The stability of unstabilized crystalline polypropylene to heat aging also varies with the amount of impurities or catalyst residue remaining in the polymer, and in certain cases, the polymer is so unstable that fibers produced therefrom disintegrate within 5 to 10 hours at 125° C. This susceptibility of polypropylene to deteriorate under such conditions is much greater than that observed with most other high molecular weight polyolefin resin. This can be seen when one considers that unstabilized polyethylene fibers can withstand 500 hours at 100° C. without serious loss in strength.

While it is known that small amounts of some antioxidants, for example, 4,4'-thiobis(6-tertiarybutyl-3-methylphenol), 2,2 - bis(4-hydroxyphenyl)-propane(Bisphenol A), diphenylamine, hydroquinone, etc., can be added to polypropylenes to prevent degradative effects during the short period the polymer is heated for melt spinning to produce fibers, it is not possible by the use of these conventional and well known antioxidants to prevent the oxidative degradation that occurs over prolonged exposure to air at temperatures below the melting temperature of polypropylene. For example, the inclusion in a polypropylene fiber of two percent by weight of 4,4'-thiobis(6-tertiarybutyl - 3 - methylphenol), which is known to be one of the most effective antioxidants for polyethylene, increases the time of exposure at 125° C. required to cause 50 percent loss in strength from 50 hours to only about 150 hours. It can be seen that this is still inferior to unstabilized polyethylene fibers.

It has now been found that oxidative degradation of polypropylene can be controlled by incorporating in the polypropylene small amounts, sufficient to reduce oxidation therein, of low molecular weight resins which are condensation products of para-tertiaryalkylphenols and formaldehyde. Polypropylene compositions of improved stability are obtained when as little as about 0.05 percent by weight of the antioxidant is used; the amount added can vary from about 0.05 percent to about 5 percent by weight or more, and is preferably from about 0.5 percent to about 3 percent of para-tertiaryalkylphenol-formaldehyde A-stage resin by weight of the polypropylene composition. The inclusion of the antioxidants herein disclosed in polypropylene greatly also improves the heat stability of the resin for extended periods at temperatures below the melting point thereof.

The low molecular weight para-tertiaryalkylphenol-formaldehyde resins suitable for use in this invention are the A-stage resins produced by the reaction of para-tertiaryalkylphenols with formaldehyde in the presence of a catalyst. The A-stage of a phenol-formaldehyde resin is the early stage in the production of these thermosetting resins in which the product produced is still soluble in certain liquids and fusible. This stage in the production of thermosetting resins is distinguished from the B-stage and C-stage. The B-stage is an intermediate stage in the reaction of a thermosetting resin in which the product softens when heated and swells when in contact with certain liquids, but does not entirely fuse or dissolve. The C-stage is the final stage in the reactions of a thermosetting resin in which the material is relatively insoluble and infusible; thermosetting resins in a fully cured plastic are in this stage.

The A-stage resins used as antioxidants in this invention are those produced by the reaction of para-tertiaryalkylphenols with formaldehyde in the presence of a suitable catalyst, such as oxalic acid, by procedures which are well known in the plastics art. Among the para-tertiaryalkylphenols which can be used in producing the suitable A-stage resins by reaction with formaldehyde are the para-tertiaryalkylphenols containing from 4 to about 20 carbon atoms or more, preferably from 4 to about 10 carbon atoms, such as para-tertiarybutylphenol, para-tertiaryamylphenol, para-tertiaryheptylphenol, para-tertiarynonylphenol, and the like.

Illustrative of the A-stage resins that can be used to control the oxidative degradation of polypropylene are para-tertiarybutylphenol-formaldehyde resin, para-tertiaryamylphenol-formaldehyde resin, para-tertiarynonylphenol-formaldehyde resin, para-tertiarydodecylphenol-formaldehyde resin, and the like. The resins can be prepared from the pure phenol or from a mixture of isomeric phenols. However, the effectiveness of the A-stage resins as antioxidants is dependent on the para-tertiaryalkylphenol content in the resin. Thus, as is seen below in Example 5, a resin produced from an isomeric mixture of butylphenols, which was predominantly para-tertiarybutylphenol, was an effective antioxidant, but larger quantities of the A-stage resin were needed in order to have a sufficient concentration of the para-tertiarybutylphenol-formaldehyde resin in the polypropylene to give equivalent stabilization to that achieved when a para-tertiarybutylphenol-formaldehyde resin produced from para-tertiarybutylphenol alone was used as antioxidant. Also, mixtures of two or more para-tertiaryalkylphenol-formaldehyde resins can be employed.

The discovery that A-stage para-tertiaryalkylphenol-formaldehyde resins have such an outstanding stabilizing action is most surprising, and would not be expected in view of their relatively poor behavior in other polyolefins, for example, polyethylene. Also, it is unexpected and unpredictable that it is only the para-tertiaryalkylphenol-formaldehyde resins that exhibit this stabilizing effect, and that resins produced with the ortho and meta tertiaryalkylphenol isomers do not stabilize polypropylene to the same desirable degree; and neither do the n- or iso-alkyl isomers.

The effectiveness of the para-tertiaryalkylphenol-formaldehyde resins as stabilizers for polypropylene can often be synergistically increased by the addition to the stabilized polypropylene composition of a second conventional antioxidant, for example, a small amount of 4,4'-thiobis(6-tertiarybutyl-3-methylphenol) or carbon black. In addition, pigments, lubricants, fillers, light stabilizers, and other additives can also be added to the polypropylene compositions stabilized according to the processes disclosed by this invention.

The para-tertiaryalkylphenol-formaldehyde resin stabilizer can be incorporated into the polypropylene by any suitable means, for example, by fluxing the polypropylene with the stabilizer on heated rolls, by the use of Banbury mixers, or of heated extruders, and the like, or by the use of a solvent solution of the stabilizer.

The percent strength retained, or tenacity, was determined at 125° C. in an air oven by the procedure of ASTM D-1380-55T.

The following examples further serve to illustrate this invention.

Example 1

A one pound sample of polypropylene, which had a melt index of 1.3 decigrams per minute (ASTM D-1236-52T), an ash of 0.06% by weight and a density of 0.9098 gram per cc., was fluxed on a two roll mill heated to a temperature of 190° C., and the fluxed material was milled for about 5 minutes. During this treatment 0.02 pound of para-tertiaryamylphenol-formaldehyde A-stage resin was compounded with the polypropylene. This A-stage resin was produced by heating a mixture of para-tertiaryamylphenol, formaldehyde and oxalic acid as catalyst under reflux until the condensation product was prepared. It was then vacuum distilled to remove formed water, unreacted phenol and volatile low molecular weight condensation products; cooled and ground. The stabilized polypropylene composition was cooled and chipped. Fibers were spun from the chips by conventional spinning techniques using a spinnerette containing 25 orifices, each 0.02 inch in diameter. The molten polymer was extruded at 275° C. at an orifice velocity of about 8 feet per minute, stretched about 50 fold while still in a molten condition and then cooled in a stream of gas. The unoriented fibers were then steam stretched from 300 to 400 percent, and collected on a yarn package. The stretched yarns were then rewound onto wire frames designed to prevent free relaxation, and placed in a 125° C. air circulating oven. The exposed yarns were examined and evaluated for changes in physical properties at regular intervals of time.

In similar manner fibers were prepared and tested using other antioxidants known to be useful in stabilizing polymeric compositions. The results are tabulated below; all samples contained 2 percent by weight antioxidant.

| Stabilizer | 125° C. Air Oven Exposure | |
|---|---|---|
| | Hours to 50% Strength Loss | Hours to Rupture |
| Para-tertiaryamylphenol-formaldehyde resin | 677 | No rupture at 749 hours. |
| 4,4'-Thiobis(6-tertiarybutyl-3-methylphenol) | 55 | over 70. |
| Bisphenol A | 10 | 20. |
| Diphenylamine | 7 | 20. |
| 2-Benzimidozolethiol | 25 | 30. |
| Hydroquinone | 25 | 30. |
| Control (none) | 2 | 10. |

Example 2

A polypropylene having a melt index of 2.5 decigrams per minute, an ash content of 0.06% by weight and a density of 0.905 gram per cc. was stabilized with varying amounts of para-tertiaryamylphenol-formaldehyde A-stage resin, and extruded into filaments in the same manner as described in Example 1. In addition, fiber samples were prepared containing varying amounts of 4,4'-thiobis(6-tertiarybutyl-3-methyl-phenol) for comparison purposes. The results are tabulated below:

| Stabilizer | Percent Conc. | Percent Strength Retained in 125° C. Air Oven | | | | | | |
|---|---|---|---|---|---|---|---|---|
| | | Exposure Time, Hours | | | | | | |
| | | 50 | 60 | 100 | 200 | 300 | 400 | 600 |
| Para-tertiaryamylphenol-formaldehyde resin. | 0.05 | 94 | 45 | (¹) | | | | |
| | 0.2 | 76 | | 88 | (¹) | | | |
| | 0.5 | 95 | | 94 | 44 | (¹) | | |
| | 2.0 | 91 | | 98 | 100 | 100 | 81 | 74 |
| 4,4'-Thiobis(6-tertiarybutyl-3-methylphenol). | 0.05 | 100 | 28 | (¹) | | | | |
| | 0.2 | 92 | | 27 | (¹) | | | |
| | 0.5 | 93 | | 89 | (¹) | | | |
| | 2.0 | 87 | | 90 | 25 | 11 | (¹) | |
| Control | 0 | 75 | 23 | (¹) | | | | |

¹ Yarn ruptured in oven.

Example 3

The same polypropylene used in Example 2 was stabilized with a 40/60 mixture of para-tertiaryamylphenol-formaldehyde and para-phenylphenol-formaldehyde A-stage resins in varying concentrations. The results on the fibers prepared therefrom are summarized below; these figures should be compared with the results obtained on the control and on the 4,4'-thiobis(6-tertiarybutyl-3-methylphenol) stabilized polypropylene given supra in the table of Example 2.

| Stabilizer | Conc., Percent | Percent Strength Retained in 125° C. Air Oven | | | | |
|---|---|---|---|---|---|---|
| | | Exposure Time, Hours | | | | |
| | | 50 | 100 | 200 | 300 | 400 |
| 40/60 Mixture of para-tertiary-amylphenol-formaldehyde resin and para-phenylphenol-formaldehyde resin. | 0.2 | | 54 | (¹) | | |
| | 0.5 | 97 | 93 | 54 | (¹) | |
| | 2.0 | 95 | 96 | 84 | 63 | (¹) |

¹ Yarn ruptured in oven.

Example 4

A blend of three propylene polymers, the blend having a melt index of 10.8 decigrams per minute, an ash content of 0.1% by weight and a density of 0.909 gram per cc., was stabilized with varying amounts of antioxidants, and fibers were prepared therefrom as described in Example 1. The following table summarizes the results obtained from the oriented yarns exposed in the 125° C. air circulating oven.

| Stabilizer | Conc., Percent | Percent Strength Retained in 125° C. Air Oven | | | |
|---|---|---|---|---|---|
| | | Exposure Time, Hours | | | |
| | | 50 | 100 | 200 | 300 |
| Para-tertiaryamylphenol-formaldehyde resin | 0.2 | 100 | 79 | (¹) | |
| | 1.0 | 100 | 98 | 47 | (¹) |
| Para-tertiarybutylphenol-formaldehyde resin | 0.2 | 100 | 60 | (¹) | |
| | 1.0 | 98 | 98 | 59 | (¹) |
| 4,4'-thiobis(6-tertiarybutyl-3-methylphenol) | 0.2 | 100 | 40 | (¹) | |
| | 1.0 | 100 | 100 | (¹) | |
| Control | 0 | (¹) | | | |

¹ Yarn ruptured in oven.

Example 5

A polypropylene having a melt index of 3.3 decigrams per minute, an ash content of 1.06% by weight and a density of 0.9178 gram per cc. was stabilized with 1% by weight thereof of a mixed tertiarybutylphenol-formaldehyde A-stage resin and extruded into filaments in a manner similar to that described in Example 1. The mixed tertiarybutylphenol-formaldehyde A-stage resin was prepared with oxalic acid catalyst wherein the phenol component was composed of 75% by weight of para-tertiarybutylphenol, 2% by weight of ortho-tertiarybutylphenol, 6% by weight of ditertiary(ortho- and para-)butylphenol and 17% by weight of unsubstituted phenol. For comparison purposes fiber samples were prepared containing 1% by weight of para-tertiaryamylphenol-formaldehyde A-stage resin and para-tertiarybutylphenol-formaldehyde A-stage resin. The results are tabulated below:

| Stabilizer, 1% | Average Time to Rupture in 125° C. Air Oven, Hours |
|---|---|
| Mixed tertiarybutylphenol-formaldehyde resin | 103 |
| Para-tertiarybutylphenol-formaldehyde resin | 187 |
| Para-tertiaryamylphenol-formaldehyde resin | 160 |

It is evident that the concentration of the para-tertiaryalkylphenol-formaldehyde A-stage resin is the important factor in stabilizing polypropylene.

Example 6

The same polypropylene used in Example 5 was stabilized with various alkylphenol-formaldehyde A-stage resins produced from n.-alkylphenols and sec.-alkylphenols and compared with a mixed nonylphenol-formaldehyde A-stage resin prepared from a mixture of primary, secondary and tertiary nonylphenols in which the para-tertiarynonylphenol isomer was in excess of 50% by weight of the isomeric mixture. The results on the stabilized fibers, at 2% by weight stabilizer content, are tabulated below:

| Stabilizer, 2% | Average Time to Rupture in 125° C. Air Oven, Hours |
|---|---|
| Mixed tertiarynonylphenol-formaldehyde resin | 290 |
| Para-n-butylphenol-formaldehyde resin | 105 |
| Para-isopropylphenol-formaldehyde resin | 70 |
| Para-ethylphenol-formaldehyde resin | 105 |
| Meta-methylphenol-formaldehyde resin | 114 |
| Ortho-(3 methylbutyl) phenol-formaldehyde resin | 105 |
| Ortho-ethylphenol-formaldehyde resin | 46 |
| Ortho-methylphenol-formaldehyde resin | 81 |

What is claimed is:

1. A polypropylene composition comprising a normally solid polypropylene and containing an A-stage para-tertiaryalkylphenol-formaldehyde resin in a small amount sufficient to stabilize said polypropylene against oxidative degradation, wherein the tertiaryalkyl group of the para-tertiaryalkylphenol contains from 4 to about 20 carbon atoms.

2. A composition comprising a normally solid polymer of propylene and between about 0.05% and 5% by weight thereof of an A-stage para-tertiaryalkylphenol-formaldehyde resin, wherein the tertiaryalkyl group of the para-tertiaryalkylphenol contains from 4 to about 20 carbon atoms.

3. A composition comprising a normally solid polymer of propylene and between about 0.5% and 3% by weight thereof of an A-stage para-tertiaryalkylphenol-formaldehyde resin, wherein the tertiaryalkyl group of the para-tertiaryalkylphenol contains from 4 to about 20 carbon atoms.

4. A composition stabilized against oxidative degradation on aging comprising a normally solid polymer of propylene and about 0.5% to about 3% by weight thereof of A-stage para-tertiaryamylphenol-formaldehyde resin.

5. A composition stabilized against oxidative degradation on aging comprising a normally solid polymer of propylene and about 0.5% to about 3% by weight thereof of A-stage para-tertiarybutylphenol-formaldehyde resin.

6. A composition stabilized against oxidative degradation on aging comprising a normally solid polymer of propylene and about 0.5% to about 3% by weight thereof of A-stage para-tertiarynonylphenol-formaldehyde resin.

References Cited in the file of this patent
UNITED STATES PATENTS

| | | |
|---|---|---|
| 2,270,959 | Murke et al. | Jan. 27, 1942 |
| 2,833,755 | Coover | May 6, 1958 |